(12) United States Patent
Pekkucuksen et al.

(10) Patent No.: US 12,086,971 B2
(45) Date of Patent: Sep. 10, 2024

(54) GLOBAL TONE MAPPING WITH CONTRAST ENHANCEMENT AND CHROMA BOOST

(71) Applicant: Samsung Electronics Co., Ltd., Suwon-si (KR)

(72) Inventors: Ibrahim Pekkucuksen, Plano, TX (US); Kaimo Lin, Plano, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 17/586,511

(22) Filed: Jan. 27, 2022

(65) Prior Publication Data
US 2023/0052082 A1 Feb. 16, 2023

Related U.S. Application Data

(60) Provisional application No. 63/231,681, filed on Aug. 10, 2021.

(51) Int. Cl.
*G06T 5/40* (2006.01)
*G06T 5/92* (2024.01)

(52) U.S. Cl.
CPC ............... *G06T 5/92* (2024.01); *G06T 5/40* (2013.01); *G06T 2207/10024* (2013.01)

(58) Field of Classification Search
CPC .... G06T 2207/10024; G06T 5/92; G06T 5/40
See application file for complete search history.

(56) References Cited

U.S. PATENT DOCUMENTS

| | | | |
|---|---|---|---|
| 8,314,847 B2 | 11/2012 | Brunner | |
| 8,774,553 B1 | 7/2014 | Winn | |
| 8,774,554 B1 | 7/2014 | Winn | |
| 8,907,971 B2 | 12/2014 | Ballestad et al. | |
| 2010/0157078 A1* | 6/2010 | Atanassov | G06T 5/50 348/222.1 |
| 2011/0229019 A1* | 9/2011 | Batur | G06T 5/70 382/164 |
| 2016/0366386 A1* | 12/2016 | Douady-Pleven | G06T 5/75 |
| 2019/0005630 A1* | 1/2019 | Li | G06T 5/92 |
| 2020/0219238 A1* | 7/2020 | Peng | G06T 5/40 |
| 2021/0042894 A1 | 2/2021 | Yelton | |

FOREIGN PATENT DOCUMENTS

| | | | | |
|---|---|---|---|---|
| GB | 2519336 A | * | 4/2015 | ............... G06T 5/00 |
| WO | 2015183542 A1 | | 12/2015 | |
| WO | 2020013904 A1 | | 1/2020 | |

* cited by examiner

*Primary Examiner* — Carol Wang (57) ABSTRACT

An apparatus includes at least one processing device configured to obtain an input image and determine a cumulative distribution function (CDF) histogram from a luminance or luma (Y) channel of the input image. The at least one processing device is also configured to determine an entry CDF histogram in a CDF histogram lookup table (LUT) closest to the determined CDF histogram. The at least one processing device is further configured to apply a Y channel global tone mapping (GTM) curve to the input image based on one or more parameters assigned to the entry CDF histogram from the CDF histogram LUT.

20 Claims, 9 Drawing Sheets

GLOBAL TONE MAPPING WITH CONTRAST ENHANCEMENT AND CHROMA BOOST

CROSS-REFERENCE TO RELATED APPLICATION AND PRIORITY CLAIM

This application claims priority under 35 U.S.C. § 119(e) to U.S. Provisional Patent Application No. 63/231,681 filed on Aug. 10, 2021, which is hereby incorporated by reference in its entirety.

TECHNICAL FIELD

This disclosure relates generally to image processing. More specifically, this disclosure relates to global tone mapping with contrast enhancement and chroma boost.

BACKGROUND

Tone mapping can be a significant factor affecting the look and feel of images produced during image processing. Global tone mapping generally applies a single transformation curve to all pixel locations of an image, while local tone mapping generally updates a tone mapping curve based on local region conditions in an image. However, traditional luminance or luma (Y) channel global tone mapping adjusts the brightness of an image while suppressing one or more chrominance (chroma) channels of the image.

SUMMARY

This disclosure relates to global tone mapping with contrast enhancement and chroma boost.

In a first embodiment, an apparatus includes at least one processing device configured to obtain an input image and determine a cumulative distribution function (CDF) histogram from a luminance or luma (Y) channel of the input image. The at least one processing device is also configured to determine an entry CDF histogram in a CDF histogram lookup table (LUT) closest to the determined CDF histogram. The at least one processing device is further configured to apply a Y channel global tone mapping (GTM) curve to the input image based on one or more parameters assigned to the entry CDF histogram from the CDF histogram LUT.

In a second embodiment, a method includes obtaining an input image and determining a CDF histogram from a Y channel of the input image. The method also includes determining an entry CDF histogram in a CDF histogram LUT closest to the determined CDF histogram. The method further includes applying a Y channel GTM curve to the input image based on one or more parameters assigned to the entry CDF histogram from the CDF histogram LUT.

In a third embodiment, a non-transitory machine readable medium contains instructions that when executed cause at least one processor of an electronic device to obtain an input image and determine a CDF histogram from a Y channel of the input image. The medium also contains instructions that when executed cause the at least one processor to determine an entry CDF histogram in a CDF histogram LUT closest to the determined CDF histogram. The medium further contains instructions that when executed cause the at least one processor to apply a Y channel GTM curve to the input image based on one or more parameters assigned to the entry CDF histogram from the CDF histogram LUT.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to"

another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, described below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, tone mapping can be a significant factor affecting the look and feel of images produced during image processing. Global tone mapping generally applies a single transformation curve to all pixel locations of an image, while local tone mapping generally updates a tone mapping curve based on local region conditions in an image. However, traditional luminance or luma (Y) channel global tone mapping adjusts the brightness of an image while suppressing one or more chrominance (chroma) channels of the image. As a result, these approaches may brighten images while suppressing colors in the images. Among other things, this may lead to the generation of overexposure effects, such as when humans look pale and white in images. This may be particularly problematic for images captured at nighttime or in other low-light conditions.

This disclosure provides techniques for global tone mapping (GTM) with contrast enhancement and chroma boost. As described in more detail below, a cumulative distribution function (CDF) histogram can be determined from the Y channel of an input image. An entry CDF histogram in a CDF histogram lookup table (LUT) closest to the determined CDF histogram can be identified, and a Y channel GTM curve can be applied to the input image based on one or more parameters assigned to the entry CDF histogram from the CDF histogram LUT. A chroma GTM curve can also be applied to the input image after the Y channel GTM curve has been applied. In this way, Y channel GTM and chroma GTM can be used to increase the brightness of an image with reduced or minimal contrast loss and with a boost to color.

Figure 1:
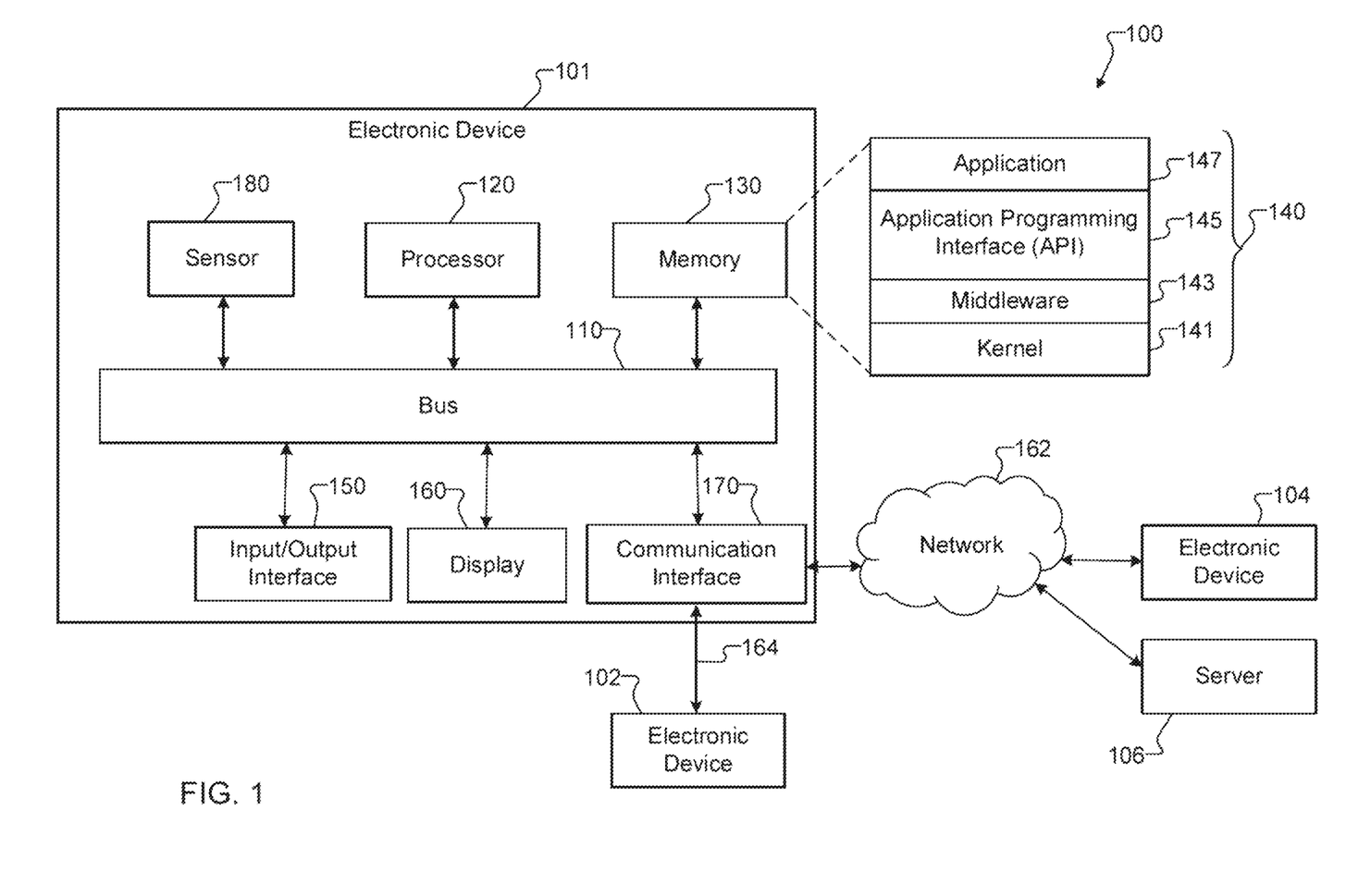
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain and process input images using global tone mapping curves based on a CDF histogram and chroma enhancement as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process input images using global tone mapping curves based on a CDF histogram and chroma enhancement. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may obtain and process input images using global tone mapping curves based on a CDF histogram and chroma enhancement as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
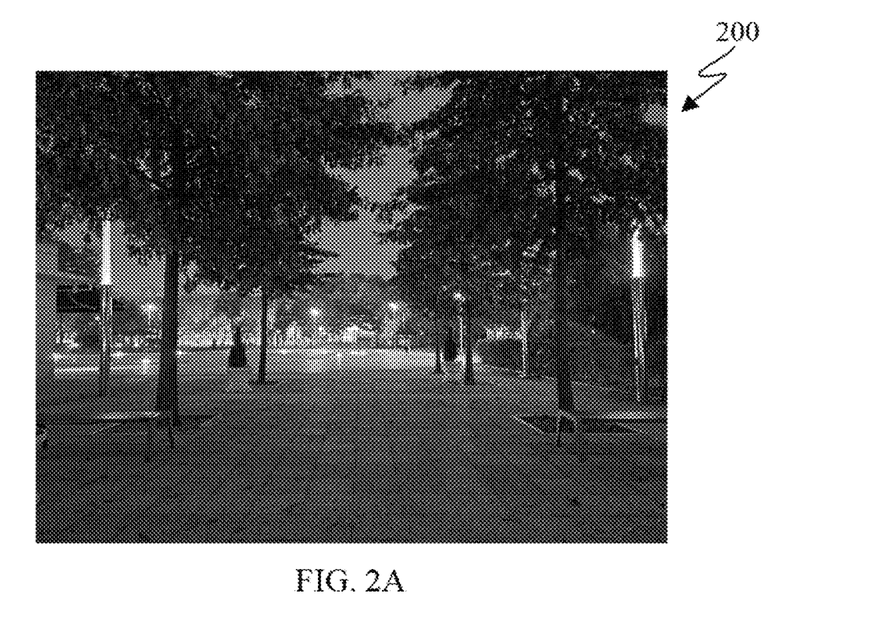
FIGS. 2A and 2B illustrate example images identifying a possible benefit of using global tone mapping with contrast enhancement and chroma boost in accordance with this disclosure.
Figure 2B:
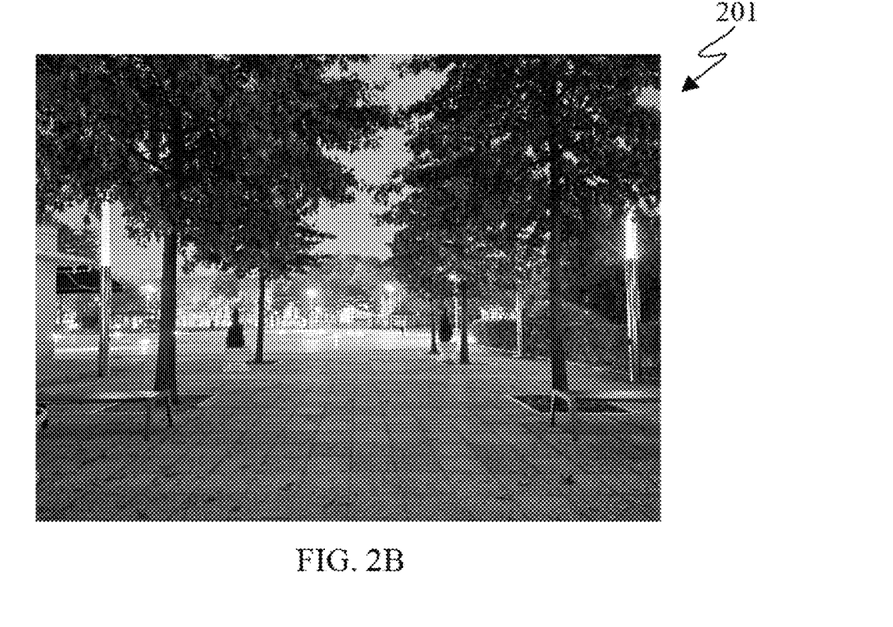

FIGS. 2A and 2B illustrate example images 200 and 201 identifying a possible benefit of using global tone mapping with contrast enhancement and chroma boost in accordance with this disclosure. In particular, FIG. 2A illustrates an example image 200 generated without using the proposed techniques described below, and FIG. 2B illustrates an example GTM-processed image 201 generated using the proposed techniques described below. As shown in FIG. 2A, the image 200 captures a scene with an empty parking lot at night. A walkway leads to the parking lot in a center of the scene, and trees and benches are positioned on either side of the walkway. In the image 200, details can be more difficult to see, colors can appear dull, and overall brightness can be low. For example, the leaves on the trees are dark, which make individual leaves and other details difficult to distinguish. Also, the benches tend to blend in with the walkway, and the ground around the trees and texture details of the walkway are difficult to identify.

As shown in FIG. 2B, the GTM-processed image 201 captures the same scene as the image 200, but the image 201 has been processed using the techniques described below. Through the use of these techniques, the image 201 has an increased overall brightness with little or minimal loss in contrast. Note that while contrast loss is reduced or minimized, some contrast loss may still remain, such as in one or more darker portions of the image 201. When processing the brightness of an image, information across the image is typically used but has a limited dynamic range. Based on the limited dynamic range, the range is compressed to optimize the information that is available. In this example, individual leaves are more clearly distinguished in the image 201 compared to the image 200. Also, the benches no longer blend into the walkway, and details of the walkway are easier to identify in the image 201.

Although FIGS. 2A and 2B illustrate examples of images 200 and 201 identifying a possible benefit of using global tone mapping with contrast enhancement and chroma boost, various changes may be made to FIGS. 2A and 2B. For example, captured images may vary widely based on the scenes being imaged, and FIGS. 2A and 2B are merely meant to provide an illustrative example of the types of benefits that may be obtained using the techniques described below.

Figure 3A:
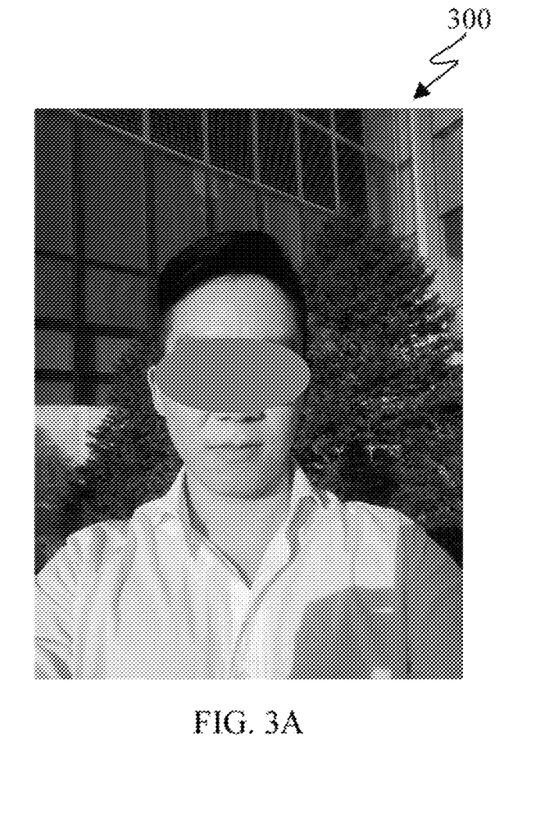
FIGS. 3A and 3B illustrate other example images identifying a possible benefit of using global tone mapping with contrast enhancement and chroma boost in accordance with this disclosure.
Figure 3B:
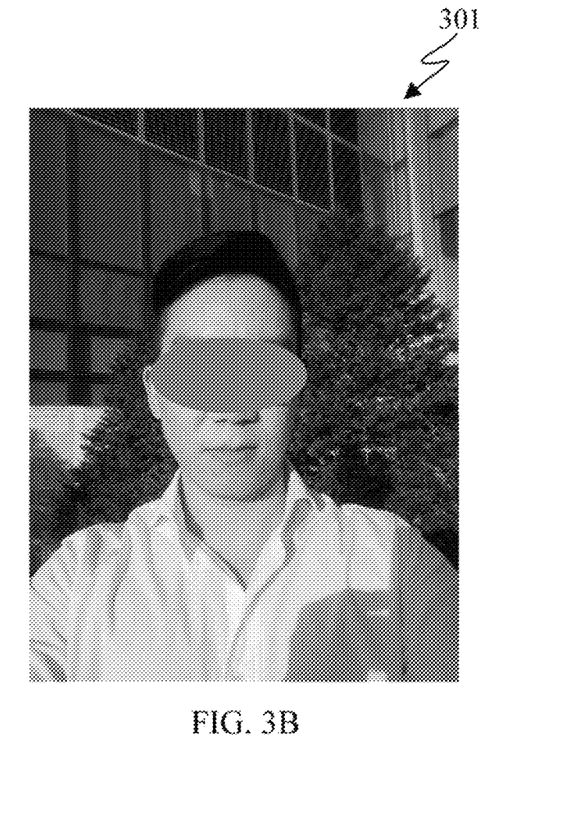

FIGS. 3A and 3B illustrate other example images 300 and 301 identifying a possible benefit of using global tone mapping with contrast enhancement and chroma boost in accordance with this disclosure. In particular, FIG. 3A illustrates an example image 300 generated without using the proposed techniques described below, and FIG. 3B illustrates an example GTM-processed image 301 generated using the proposed techniques described below. A person's face as captured in the images 300 and 301 is partially obscured here for privacy.

As shown in FIG. 3A, the image 300 may be produced using Y channel GTM only. As shown in FIG. 3B, the image 301 may be produced using Y channel GTM and chroma GTM as described in more detail below. The use of Y channel GTM only causes a person in the image 300 to appear paler and washed-out, while the use of Y channel GTM and chroma causes the same person in the image 301 to appear more natural. The unnatural look of the person's face in FIG. 3A may be caused by saturation loss and color loss due to the Y channel GTM. To adjust the unnatural look of the person's face, saturation correction and color correction can be applied when generating the image 301, which results in a more pleasing and visually-accurate image.

Although FIGS. 3A and 3B illustrate other examples of images 300 and 301 identifying a possible benefit of using global tone mapping with contrast enhancement and chroma boost, various changes may be made to FIGS. 3A and 3B. For example, captured images may vary widely based on the scenes being imaged, and FIGS. 3A and 3B are merely meant to provide an illustrative example of the types of benefits that may be obtained using the techniques described below.

Figure 4A:
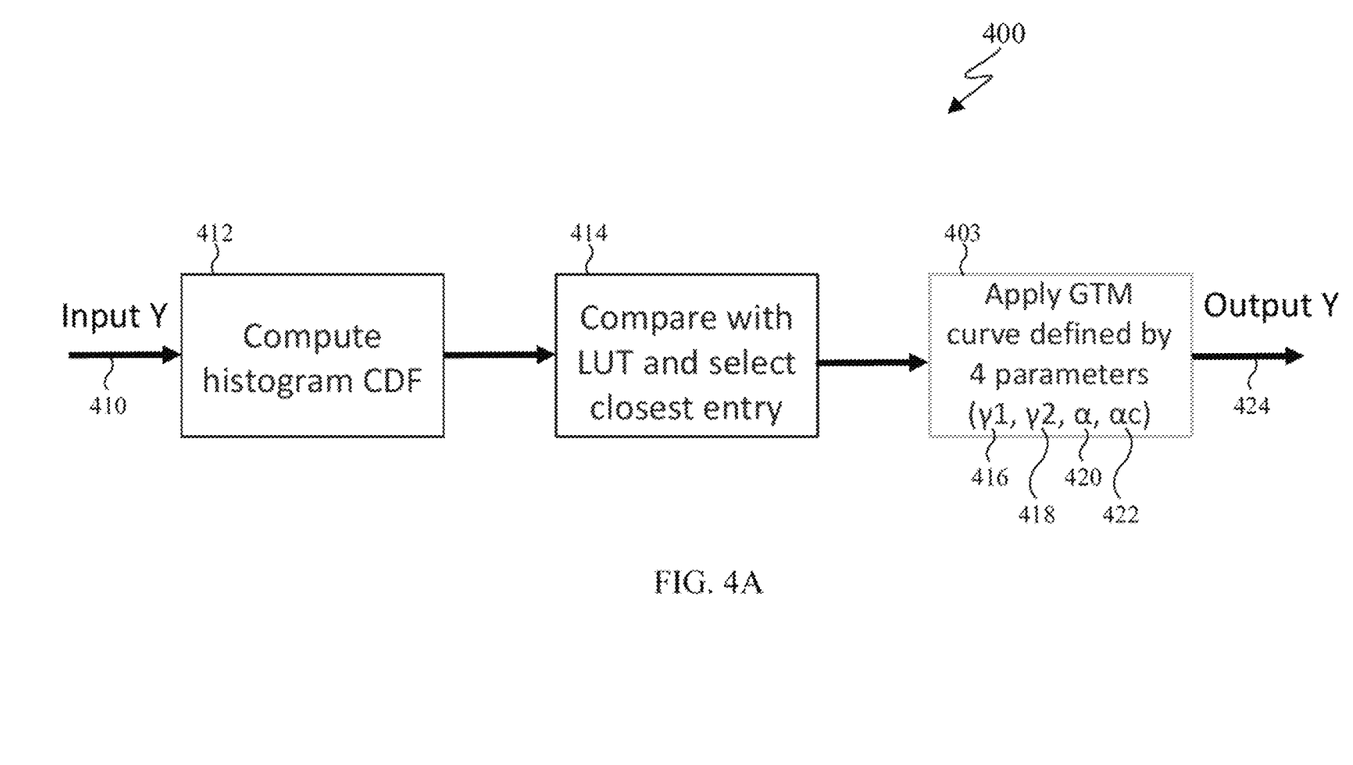
FIGS. 4A through 4I illustrate an example scene classification scheme in accordance with this disclosure.
Figure 4B:
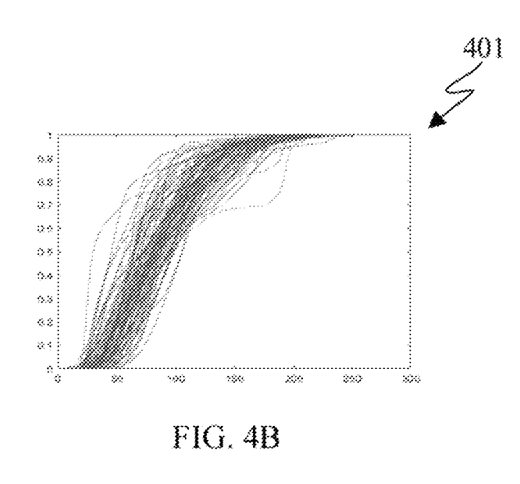
Figure 4C:
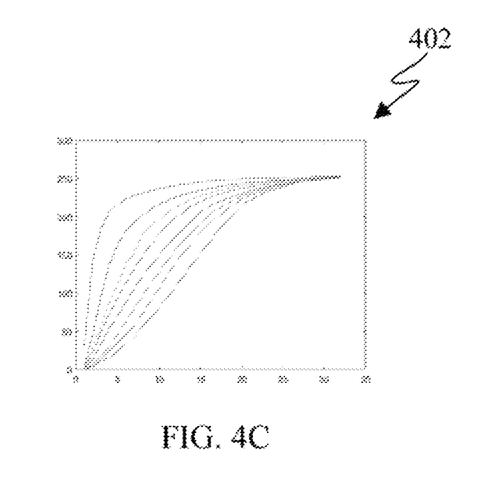
Figure 4D:
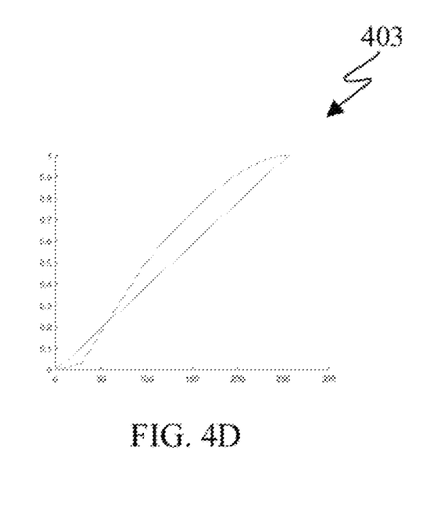
Figure 4E:
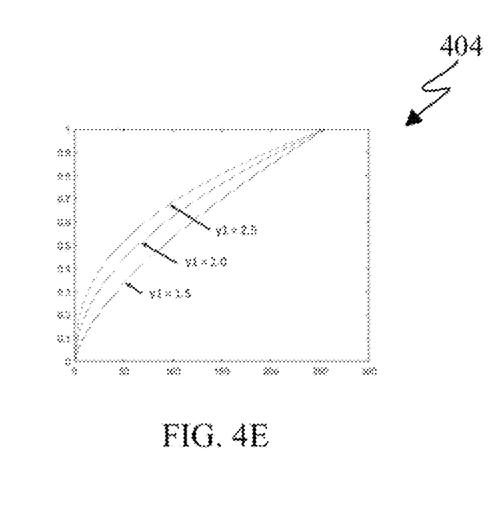
Figure 4F:
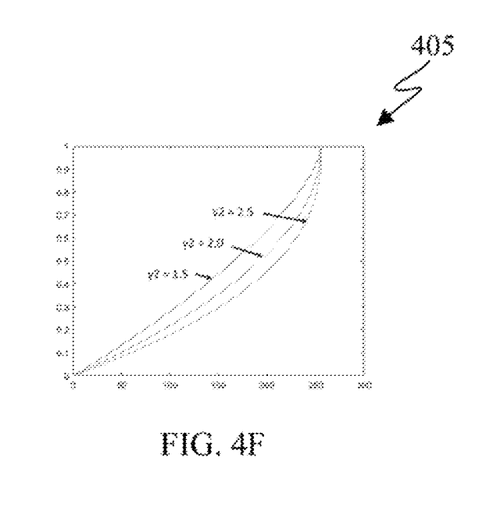
Figure 4G:
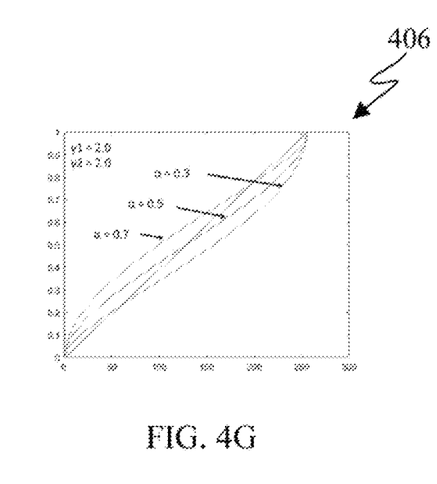
Figure 4H:
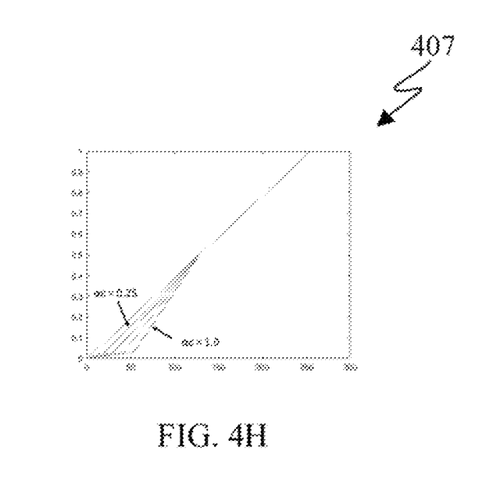
Figure 4I:
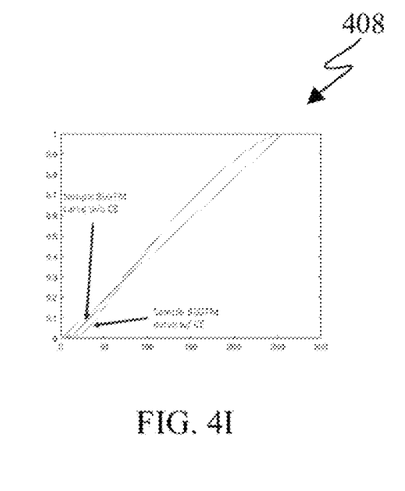

FIGS. 4A through 4I illustrate an example scene classification scheme 400 in accordance with this disclosure. In particular, FIG. 4A illustrates an example scene classification scheme 400, FIG. 4B illustrates an example CDF histogram dataset 401, and FIG. 4C illustrates an example CDF histogram LUT 402. Also, FIG. 4D illustrates an example GTM curve 403, FIG. 4E illustrates an example y1 GTM curve 404, and FIG. 4F illustrates an example y2 GTM curve 405. In addition, FIG. 4G illustrates an example combined GTM curve 406, FIG. 4H illustrates an example contrast enhancement function 407 at various strength levels, and FIG. 4I illustrates an example contrast-enhanced GTM curve 408 using the contrast enhancement function 407.

As shown here, global tone mapping is a subjective task where preferences for toning scenes can be different for each person and different for each scene. Unique tone mapping curves can be used to satisfy different requirements for each scene. In this example, the classification scheme 400 can create a CDF histogram dataset 401. An example of a CDF histogram dataset 401 is shown in FIG. 4B. In some embodiments, the CDF histogram dataset 401 is generated from a dataset showing different scenes. The CDF histograms in the CDF histogram dataset 401 can be generated with the same type of sensor and the same type of lens, which can help to limit variations between the scene CDFs based on hardware. In some cases, the individuals CDFs may be in the same neighborhood even though there may be slight differences between the CDFs. A CDF histogram describes a probability that a random pixel has an intensity at each value within a specific range of pixel values. A CDF histogram can be based on an actual scene, where the intensity of each pixel is tracked and documented. Thus, a CDF histogram can indicate the overall brightness or the overall darkness of an image.

Different scenes can be classified into different classes, such as night scenes, outdoor scenes, indoor scenes, etc. In some embodiments, each class can be assigned a number associated with a specific GTM curve. In particular embodiments, eight classes can be used to define scenes, and this number of classes is used in the examples below. Note, however, that any other suitable number of classes may be defined. Each class can have a unique GTM curve with one or more specific parameters. The classification scheme 400 can create a GTM histogram LUT 402 of selected CDF histograms from the CDF histogram dataset 401 that are classified for specific scenes. An example of a CDF histogram LUT 402 is shown in FIG. 4C. The CDF histogram LUT 402 can be composed of a specified number of scene CDF histograms, such as eight CDF histograms, sixteen CDF histograms, thirty-two CDF histograms, etc. The scene CDF histograms in the CDF histogram LUT 402 can be generated manually, synthetically, using interpolation, or in any other suitable manner. In some embodiments, one or more entries in the CDF histogram LUT 402 may be created by k-means clustering observed CDF histograms found in the CDF histogram dataset 401. However, in some cases, the CDF histogram dataset 401 may not have a decent sample for extremely dark scenes and extremely bright scenes. Thus, the CDF histograms in the CDF histogram LUT 402 on the far left and the far right can be extrapolated to cover darker and brighter scenes.

In the CDF histogram LUT 402, one or more parameters for a CDF histogram can be calculated for each scene in order to determine a GTM curve to apply to images in that respective scene. The one or more parameters corresponding to a CDF histogram can produce a specific GTM curve for enhancing images capturing a specific scene. Because each scene can have different characteristics, the one or more parameters applied to one scene may not be optimal for application to another scene. For example, in a scene where very little light is captured, an image would appear very dark, and a large brightness increase may be applied. In another scene that is overdeveloped, a large increase in brightness could cause details to be lost. Thus, the CDF histograms for these two scenes can be very different. The first scene (where little light is captured) can have pixel values concentrated on the low side of the CDF histogram, while the second scene can have pixel values that are more balanced. As a result, CDF histograms represent a good mechanism for differentiating between different scenes, and each CDF histogram in the CDF histogram LUT 402 can represent or otherwise be associated with a specific class of scenes. When a CDF histogram for a new image is calculated, the adjustment of the scene captured in the new image becomes easier to manage. Ideally, a limited number of CDF histograms may be used when classifying scenes in the CDF histogram LUT 402 to reduce complexity. In some cases, each CDF histogram in the CDF histogram LUT 402 can represent an average of the histograms for scenes in a class.

Each of the CDF histograms is associated with a unique GTM curve 403. Each GTM curve 403 can be used to adjust images of the specific type of scene with which the respective CDF histogram is associated. In this example, each GTM curve 403 is associated with a set of parameters, such as a y1 parameter 416, a y2 parameter 418, an alpha parameter 420, and a contrast enhancement parameter 422. An example of a GTM curve 403 is shown in FIG. 4D. As the GTM curve 403 is limited to a specified range of pixel values, some compression is produced using the GTM curve 403. For example, input values at the top right part of the GTM curve 403 can be mapped to values that are close to a maximum value. Pixels with these input values at the top end of the curve may show contrast loss. For the GTM curve of the classification scheme 400, the values on the low side can be pulled lower for contrast enhancement, and values on the high side can be pushed higher for maintaining details on a high side of the GTM curve.

The GTM curves 403 can be generated by identifying each curve's set of parameters, such as its y1 parameter 416, y2 parameter 418, alpha parameter 420, and contrast enhancement parameter 422. In general, a unique set of parameters can be produced for each CDF histogram in the CDF histogram LUT 402. In some cases, the parameters can be refined, such as by using trial and error adjustments. The y1 parameter 416 can define a y1 GTM curve 404, an example of which is shown in FIG. 4E. In some embodiments, the y1 GTM curve 404 can be defined as follows:

$$c1 = x^{\left(\frac{1}{y1}\right)} \quad (1)$$

where c1 represents an output value for the y1 parameter 416. The y2 parameter 418 can define a y2 GTM curve 405, an example of which is shown in FIG. 4F. In some embodiments, the y2 GTM curve 405 can be defined as follows:

$$c2 = 1 - (1-x)^{\left(\frac{1}{y2}\right)} \quad (2)$$

where c2 represent an output value for the y2 parameter 418. The alpha parameter 420 is a weight for combining the y1 GTM curve 404 and the y2 GTM curve 405 to produce the combined GTM curve 406, an example of which is shown in FIG. 4G. In some embodiments, the combined GTM curve 406 can be defined as follows:

$$cout = c1*\alpha + c2*(1-\alpha) \quad (3)$$

where cout is the output value of the combined blended outputs c1 and c2. In some cases, the alpha parameter 420 is a value from zero to one. When the value of the alpha parameter 420 is closer to zero, the y2 parameter 418 is dominant. When the value of the alpha parameter 420 is closer to one, the y1 parameter 416 is dominant. While described as being generated by gamma functions, each GTM curve could be generated using other functions. For instance, algorithm could be implemented using a red-green-blue (RGB) space instead of a YUV space.

The classification scheme 400 can also utilize a contrast enhancement function 407 with a nonzero mapping throughout a range of pixel values to prevent information loss. Contrast enhancement is usually done by assigning multiple values in the input range to a single value. However, assigning multiple values in the input range to a single value makes the process non-reversible. In the contrast enhancement function 407, each value in the input range can be set to a slightly different output value in order to maintain detail and reversibility of the processing. Typically, many input values at a bottom end of a GTM curve can be set to a zero output value or close to a zero output value. Once the values are set to zero or close to zero, the details can be lost forever, which makes the process non-reversible. Ideally, information should not be lost in an image processing pipeline due to global tone mapping or local tone mapping. Although tone mapping usually occurs at the end of an image processing pipeline, any information lost could affect post-tone mapping functions.

In order to maintain the information at the ends of each GTM curve 403 here, the contrast enhancement function 407 can be added for enhancing contrast at a lower end of each GTM curve 403. An example of the contrast enhancement function 407 is shown in FIG. 4H. The contrast enhancement function 407 provides a non-zero slope at the lower end of the GTM curve 403 to maintain information at the lower end of the GTM curve 403. The non-zero slope can extend up to a point where output values are not as close to a zero value as an input value. In the example shown in FIG. 4H, the non-zero slope extends to around an input value of fifty. At the end of the non-zero slope, a second slope brings the contrast enhancement function 407 back to the original line. The contrast enhancement function 407 here essentially applies a curve to maintain contrast for input values that would be assigned output values close to zero. The contrast enhancement function 407 can process each combined GTM curve 406 to produce a contrast-enhanced GTM curve 408, an example of which is shown in FIG. 4I. While the non-zero slope and the second slope appear to be an extensive addition, the difference between the contrast-enhanced GTM curve is only slightly different from the identity line. While the bottom of the GTM curve 408 is pulled lower, the contrast enhance GTM curve 408 does not have multiple inputs assigned to a single output. Note that while described as using a piece-wise linear function, the contrast enhancement function 407 could use a hyperbolic function or any other suitable function.

When an input image frame 410 is captured, the input image frame 410 can be processed using the classification scheme 400. In some cases, the input image frame 410 can capture a scene using a sensor and a lens used in developing the CDF histogram dataset 401 and the CDF histogram LUT 402. In other cases, the input image frame 410 can capture a scene using a different sensor or a different lens than the sensor and lens used in developing the CDF histogram dataset 401 and the CDF histogram LUT 402. When the input image frame 410 is captured, the classification scheme 400 can compute a scene CDF histogram 412 for the input image frame 410. The scene CDF histogram 412 can be compared to the histogram CDFs in the CDF histogram LUT 402, and a LUT entry CDF histogram 414 is selected from the CDF histogram LUT 402. For example, the LUT entry CDF histogram 414 that is closest or most similar to the scene CDF histogram 412 can be selected. In some embodiments, the classification scheme 400 can compute a distance from the scene CDF histogram 412 to each LUT entry CDF histogram 414 in the CDF histogram LUT 402, and the classification scheme 400 can select a LUT entry CDF histogram 414 in the CDF histogram LUT 402 with the smallest distance from the scene CDF histogram 412. Different parts of a CDF histogram can be emphasized by providing different weights for the distance calculation. For instance, distances from a middle of a scene CDF histogram 412 to a middle of an entry CDF histogram in the CDF histogram LUT 402 can be given a greater weight than distances from an end of the scene CDF histogram 412 to an end of an entry CDF histogram in the CDF histogram LUT 402. The selected LUT entry CDF histogram 414 has a corresponding contrast-enhanced GTM curve 408, such as one that is defined by the four parameters 416-422. The contrast-enhanced GTM curve 408 can be applied to the input image frame 410 to produce an output image frame 424. The input image frame 410 and the output image frame 424 may be referred to or represent a Y channel of an input image and a Y channel of an output image, respectively.

Note that the classification scheme 400 here could be extended to video use cases, such as by implementing temporal filtering to ensure smooth transitions across frames. Also, local tone mapping (LTM) at the tile level may be performed instead of GTM at the frame level, which may allow for greater response to local conditions.

It should be noted that the functions shown in or described with respect to FIGS. 4A through 4I can be implemented in any suitable manner. For example, in some embodiments, at least some of the functions shown in or described with respect to FIGS. 4A through 4I can be implemented or supported using one or more software applications or other software instructions that are executed by the processor 120 of the server 106, electronic device 101, or other device. In other embodiments, at least some of the functions shown in or described with respect to FIGS. 4A through 4I can be implemented or supported using dedicated hardware components. In general, the functions shown in or described with respect to FIGS. 4A through 4I can be performed using any suitable hardware or any suitable combination of hardware and software/firmware instructions.

Although FIGS. 4A through 4I illustrate one example of a scene classification scheme 400, various changes may be made to FIGS. 4A through 4I. For example, various components in FIG. 4A may be combined, further subdivided, replicated, omitted, or rearranged and additional components may be added according to particular needs. Also, the curves and other information shown in FIGS. 4B through 4I are for illustration only and can vary depending on the implementation.

Figure 5A:
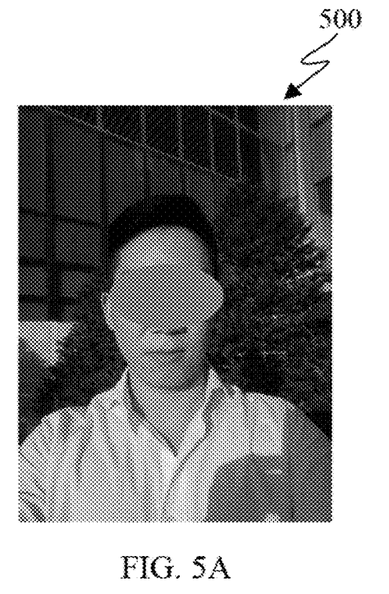
FIGS. 5A through 5H illustrate an example chrominance (chroma) channel gain map computation in accordance with this disclosure.
Figure 5B:
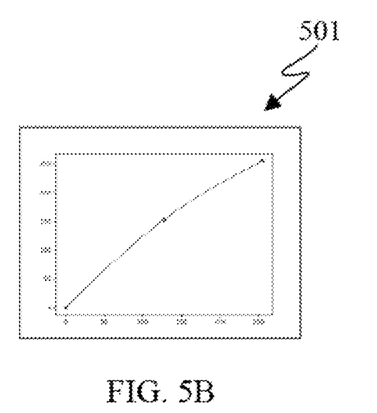
Figure 5C:
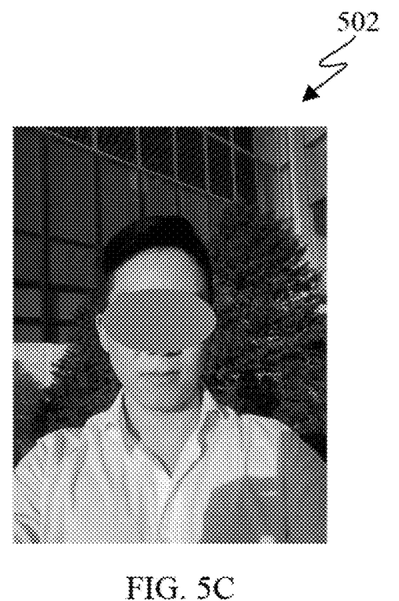
Figure 5D:
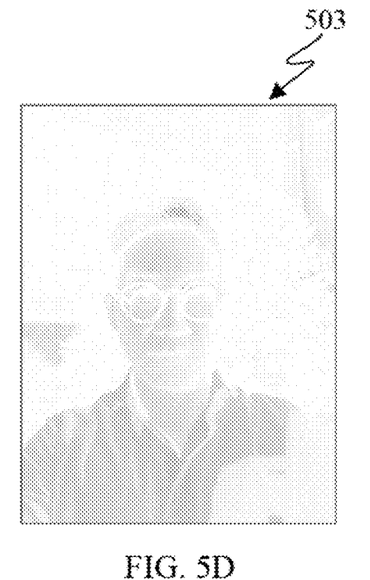
Figure 5E:
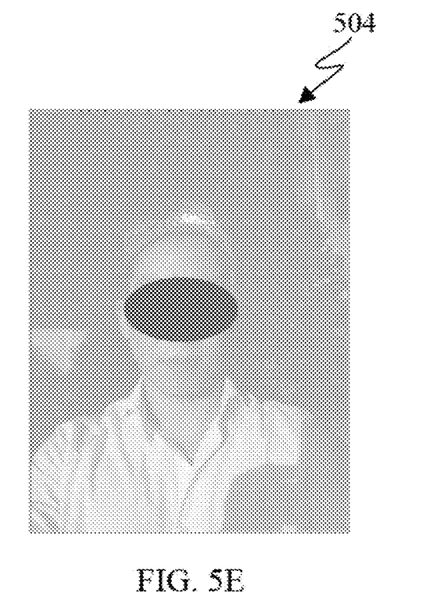
Figure 5F:
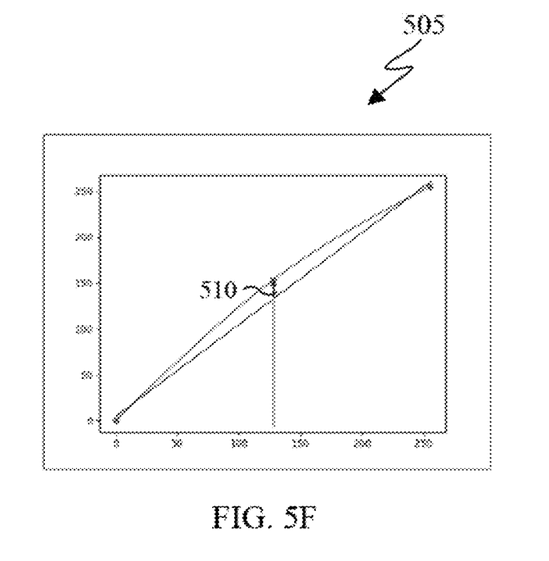
Figure 5G:
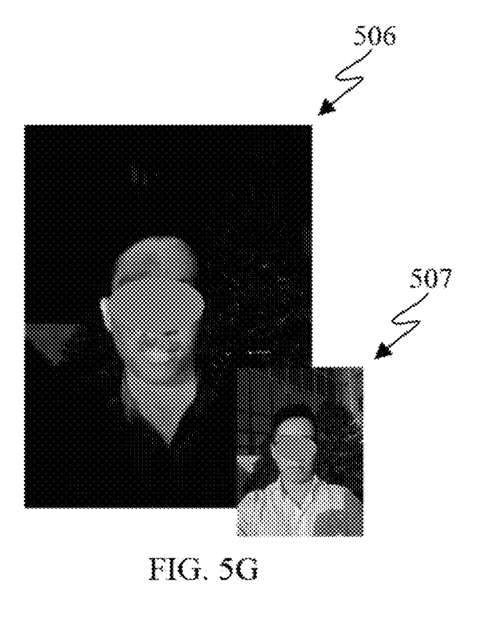
Figure 5H:
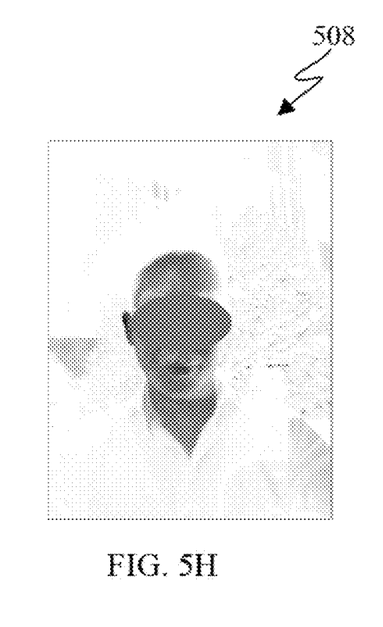

FIGS. 5A through 5H illustrate an example chrominance (chroma) channel gain map computation in accordance with this disclosure. In particular, FIG. 5A illustrates an example Y channel input 500, FIG. 5B illustrates an example Y channel GTM curve 501, and FIG. 5C illustrates an example post-GTM Y channel 502. Also, FIG. 5D illustrates an example Y channel gain map 503, FIG. 5E illustrates an example Y channel weight map 504, and FIG. 5F illustrates an example Y channel gain map graph 505. In addition, FIG. 5G illustrates an example saturation map 506 of the post-GTM Y channel 502, and FIG. 5H illustrates an example saturation weight map 508.

As shown here, GTM for a chroma channel can be different than the GTM for the Y channel. In this example, a post-GTM Y channel 502 can be produced by applying a Y channel GTM curve 501 to a Y channel input 500. This may be accomplished, for example, using the approach shown in FIG. 4A. The post-GTM Y channel 502 becomes brighter after applying the Y channel GTM curve 501 to the Y channel input 500. The change in brightness can be shown in a Y channel gain map 503, which is illustrated in FIG. 5D. The Y channel gain map 503 can be produced by subtracting the Y channel input 500 from the post-GTM Y channel 502. If the Y channel gain map 503 is equally applied to one or more chroma channels, regions with a large Y channel gain could become oversaturated. For example, the background in the Y channel gain map 503 has a lot of white channel gain. A large gain applied to the background in a chroma channel may cause oversaturation. For instance, the green color of trees in a background could be adjusted to a different shade of green, causing the background to look unnatural.

In order to address these issues, a Y channel weight map 504, an example of which is shown in FIG. 5E, can be produced from the Y channel gain map 503. Also, an example of a Y channel weight 510 for a Y channel gain map graph 505 is shown in FIG. 5F. In some embodiments, the output values for the Y channel weight map 504 can be assigned lower weights for regions with large Y channel gains. In some cases, the Y channel weight map (Yw) 504 can be defined as follows:

$$Y_w = 1 - \frac{\text{abs}(Y_{gain})}{Y + eps}, eps = 0.00001 \quad (4)$$

where Yw represents a weight output, Y represents a Y value, and Ygain represents the gain value at the Y value. The Ygain can be represented by a vertical distance between a Y channel curve and a Y channel weight curve. Based on Equation (4), a large Y channel gain can have a small Y channel weight and vice versa. For example, the face region in the Y channel gain map 503 may not have a significant Y channel gain, but a larger chroma channel weight can be assigned to the face region for more global gain.

Another consideration can be based on an original saturation level from an input image 507. An example of a saturation map 506 and an input image 507 are shown in FIG. 5G. Regions that already have high saturation can be assigned lower weights to avoid over-saturation after applying a GTM curve. A saturation weight map 508, an example of which is shown in FIG. 5H, can be used for a GTM curve to maintain contrast in high saturation areas of the input image 507. In some cases, the saturation weight map 508 can be defined as follows:

$$S_w = 1.0 - \text{normalize}(S) \quad (5)$$

where Sw represents a saturation weight map value and S represent a saturation value. Also, in some cases, the saturation weight map 508 can be combined with the Y channel weight map 504 as follows:

$$C_w = Y_w + S_w \quad (6)$$

where Cw represents a chroma weight map. Further, in some cases, a chroma gain map can be defined as follows:

$$C_{gain} = C_w + 1\frac{\text{abs}(Y_{gain})}{Y + eps}, eps = 0.00001 \quad (7)$$

where Cgain represents a chroma gain map. In addition, in some cases, the chroma gain map can be applied to the output scene 424 that has been processed with the GTM curve 403 as follows.

$$Chroma_{gtm}=C_{gain}*(Chroma-128)+128 \qquad (8)$$

It should be noted that the functions shown in or described with respect to FIGS. 5A through 5H can be implemented in any suitable manner. For example, in some embodiments, at least some of the functions shown in or described with respect to FIGS. 5A through 5H can be implemented or supported using one or more software applications or other software instructions that are executed by the processor 120 of the server 106, electronic device 101, or other device. In other embodiments, at least some of the functions shown in or described with respect to FIGS. 5A through 5H can be implemented or supported using dedicated hardware components. In general, the functions shown in or described with respect to FIGS. 5A through 5H can be performed using any suitable hardware or any suitable combination of hardware and software/firmware instructions.

Although FIGS. 5A through 5H illustrate one example of a chroma channel gain map computation, various changes may be made to FIGS. 5A through 5H. For example, the images, curves, and other information shown in FIGS. 5A through 5H are for illustration only and can vary depending on the implementation.

Figure 6:
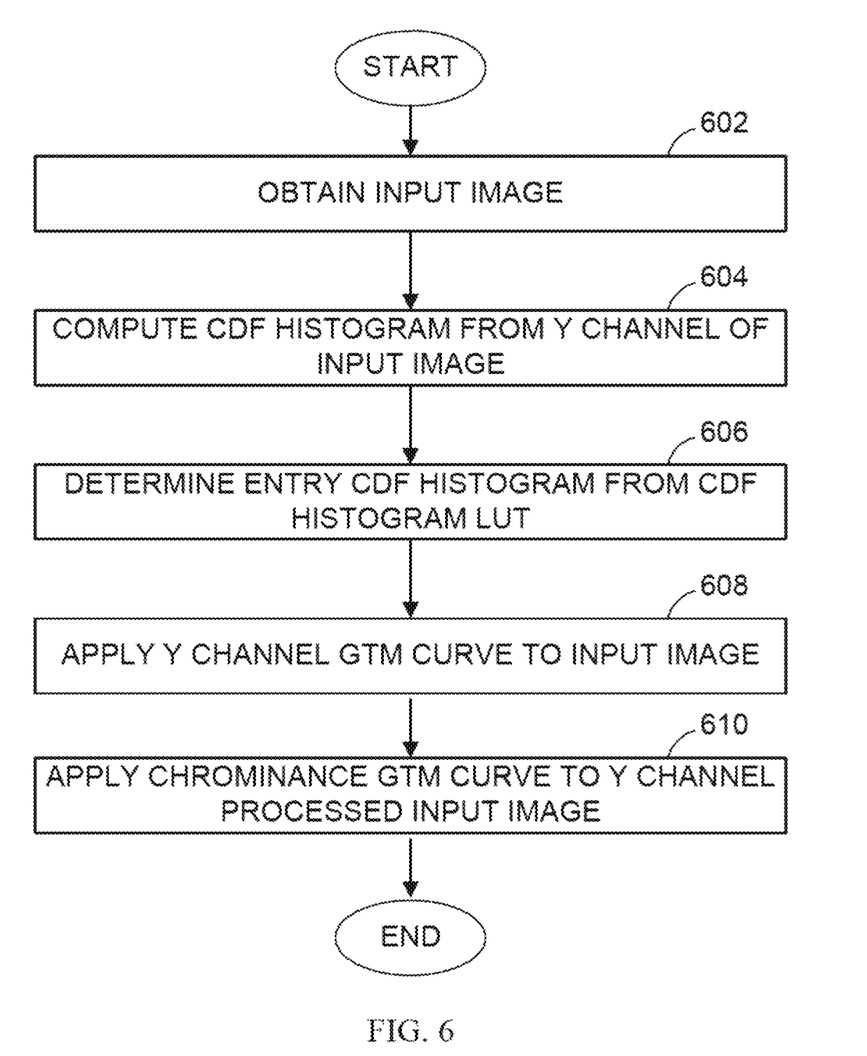
FIG. 6 illustrates an example method for global tone mapping with contrast enhancement and chroma boost according to this disclosure.

FIG. 6 illustrates an example method 600 for global tone mapping with contrast enhancement and chroma boost according to this disclosure. For ease of explanation, the method 600 of FIG. 6 is described as being performed using the electronic device 101 of FIG. 1. However, the method 600 may be used with any other suitable system and any other suitable electronic device, such as the server 106.

As shown in FIG. 6, the electronic device 101 obtains an input image at step 602. In some cases, the input image can be taken of a scene that has different levels of reflected light in the foreground and in the background. The input image can be obtained in any suitable manner, such as by capturing the input image using a sensor 180 (camera) on the electronic device 101, reading the image from a memory 130 of the electronic device, or receiving the image through a communication interface 170 of the electronic device 101 from a first external electronic device 102 over a second network 164, a second external electronic device 104 over a first network 162, or a server 108 over the first network 162.

The electronic device 101 computes a CDF histogram from a Y channel of the input image at step 604. The CDF histogram can be a graphical representation for an intensity of a scene. The CDF histogram determines an amount of pixels at or below each intensity level. The electronic device 101 determines an entry CDF histogram in a CDF histogram lookup table closest to the computed CDF histogram at step 606. For example, a distance can be determined from the computed CDF histogram to each CDF histogram in the CDF histogram LUT, and the selected entry CDF histogram can be determined based on a smallest distance from the CDF histogram for the Y channel of the input image.

The electronic device 101 applies a Y channel GTM curve to the input image based on one or more parameters assigned to the selected entry CDF histogram from the CDF histogram LUT at step 608. The one or more parameters can be assigned to the entry CDF histogram. The electronic device 101 can also apply a chrominance GTM curve to the Y channel GTM processed image at step 610. In some cases, the chrominance GTM curve can be generated based combining on a Y channel weight map and a saturation weight map.

Although FIG. 6 illustrates one example of a method 600 for global tone mapping with contrast enhancement and chroma boost, various changes may be made to FIG. 6. For example, while shown as a series of steps, various steps in FIG. 6 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. An apparatus comprising:
    at least one processing device configured to:
        obtain an input image;
        determine a cumulative distribution function (CDF) histogram from a luminance or luma (Y) channel of the input image;
        determine an entry CDF histogram in a CDF histogram lookup table (LUT) closest to the determined CDF histogram; and
        apply a Y channel global tone mapping (GTM) curve to the input image based on one or more parameters assigned to the entry CDF histogram from the CDF histogram LUT.

2. The apparatus of claim 1, wherein the at least one processing device is further configured to apply a chrominance GTM curve to the input image after the Y channel GTM curve has been applied to the input image.

3. The apparatus of claim 2, wherein the at least one processing device is further configured to determine the chrominance GTM curve based on a Y channel weight map and a saturation weight map.

4. The apparatus of claim 3, wherein the at least one processing device is further configured to:
    determine a Y channel gain map based on gains in the Y channel due to applying the Y channel GTM curve to the input image; and
    generate the Y channel weight map using the Y channel gain map, the Y channel weight map having lower weights in one or more regions associated with larger gains in the Y channel gain map.

5. The apparatus of claim 3, wherein the at least one processing device is further configured to:
    determine a saturation map based on the input image; and
    generate the saturation weight map using the saturation map, the saturation weight map having lower weights in one or more regions associated with higher levels of saturation.

6. The apparatus of claim 1, wherein the at least one processing device is further configured to:
    receive a CDF histogram dataset comprising a plurality of CDF histogram entries; and
    generate the CDF histogram LUT from a select number of CDF histogram entries from the CDF histogram dataset.

7. The apparatus of claim 6, wherein, to determine the entry CDF histogram in the CDF histogram LUT closest to the determined CDF histogram, the at least one processing device is configured to:
    determine a distance from the CDF histogram for the Y channel of the input image to each of the CDF histogram entries in the CDF histogram LUT; and determine the entry CDF histogram based on a smallest distance.

8. A method comprising:
obtaining an input image;
determining a cumulative distribution function (CDF) histogram from a luminance or luma (Y) channel of the input image;
determining an entry CDF histogram in a CDF histogram lookup table (LUT) closest to the determined CDF histogram; and
applying a Y channel global tone mapping (GTM) curve to the input image based on one or more parameters assigned to the entry CDF histogram from the CDF histogram LUT.

9. The method of claim 8, further comprising:
applying a chrominance GTM curve to the input image after the Y channel GTM curve has been applied to the input image.

10. The method of claim 9, further comprising:
determining the chrominance GTM curve based on a Y channel weight map and a saturation weight map.

11. The method of claim 10, further comprising:
determining a Y channel gain map based on gains in the Y channel due to applying the Y channel GTM curve to the input image; and
generating the Y channel weight map using the Y channel gain map, the Y channel weight map having lower weights in one or more regions associated with larger gains in the Y channel gain map.

12. The method of claim 10, further comprising:
determining a saturation map based on the input image; and
generating the saturation weight map using the saturation map, the saturation weight map having lower weights in one or more regions associated with higher levels of saturation.

13. The method of claim 8, further comprising:
receiving a CDF histogram dataset comprising a plurality of CDF histogram entries; and
generating the CDF histogram LUT from a select number of CDF histogram entries from the CDF histogram dataset.

14. The method of claim 13, wherein determining the entry CDF histogram in the CDF histogram LUT closest to the determined CDF histogram comprises:
determining a distance from the CDF histogram for the Y channel of the input image to each of the CDF histogram entries in the CDF histogram LUT; and
determining the entry CDF histogram based on a smallest distance.

15. A non-transitory computer readable medium containing instructions that when executed cause at least one processor of an electronic device to:
obtain an input image;
determine a cumulative distribution function (CDF) histogram from a luminance or luma (Y) channel of the input image;
determine an entry CDF histogram in a CDF histogram lookup table (LUT) closest to the determined CDF histogram; and
apply a Y channel global tone mapping (GTM) curve to the input image based on one or more parameters assigned to the entry CDF histogram from the CDF histogram LUT.

16. The non-transitory computer readable medium of claim 15, wherein the instructions when executed further cause the at least one processor to apply a chrominance GTM curve to the input image after the Y channel GTM curve has been applied to the input image.

17. The non-transitory computer readable medium of claim 16, wherein the instructions when executed further cause the at least one processor to determine the chrominance GTM curve based on a Y channel weight map and a saturation weight map.

18. The non-transitory computer readable medium of claim 17, wherein the instructions when executed further cause the at least one processor to:
determine a Y channel gain map based on gains in the Y channel due to applying the Y channel GTM curve to the input image; and
generate the Y channel weight map using the Y channel gain map, the Y channel weight map having lower weights in one or more regions associated with larger gains in the Y channel gain map.

19. The non-transitory computer readable medium of claim 17, wherein the instructions when executed further cause the at least one processor to:
determine a saturation map based on the input image; and
generate the saturation weight map using the saturation map, the saturation weight map having lower weights in one or more regions associated with higher levels of saturation.

20. The non-transitory computer readable medium of claim 15, wherein:
the instructions when executed further cause the at least one processor to:
receive a CDF histogram dataset comprising a plurality of CDF histogram entries; and
generate the CDF histogram LUT from a select number of CDF histogram entries from the CDF histogram dataset; and
the instructions that when executed cause the at least one processor to determine the entry CDF histogram in the CDF histogram LUT closest to the determined CDF histogram comprise instructions that when executed cause the at least one processor to:
determine a distance from the CDF histogram for the Y channel of the input image to each of the CDF histogram entries in the CDF histogram LUT; and
determine the entry CDF histogram based on a smallest distance.

* * * * *